United States Patent
Ogawa et al.

(10) Patent No.: US 6,224,788 B1
(45) Date of Patent: *May 1, 2001

(54) LIQUID CRYSTAL ALIGNING AGENT AND PROCESS FOR PRODUCING LIQUID CRYSTAL ALIGNMENT FILM USING THE SAME

(75) Inventors: Toshihiro Ogawa, Birmingham, AL (US); Shoichi Nakata, Mie (JP); Yutaka Makita, Mie (JP); Masayuki Kimura, Mie (JP); Yasumasa Takeuchi, Yokohama (JP); Yasuo Matsuki, Mie (JP); Shin-ichi Kimura, Mie (JP)

(73) Assignee: JSR Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,312

(22) Filed: Mar. 12, 1998

(30) Foreign Application Priority Data

Mar. 13, 1997 (JP) ..................................... 9-078985

(51) Int. Cl.⁷ .................................. C09K 19/56
(52) U.S. Cl. ........................ 252/299.4; 428/1.26; 428/1.2
(58) Field of Search ......................... 252/299.4; 428/1.1, 428/1.2, 1.25, 1.26

(56) References Cited

U.S. PATENT DOCUMENTS 5,464,669  11/1995  Kang et al. ................. 428/1
5,538,823  7/1996   Park et al. ................. 430/20
5,607,732  3/1997   Miyamoto et al. ........... 428/1

FOREIGN PATENT DOCUMENTS 0 708 354    4/1996   (EP).
2 307 240    5/1997   (GB).
WO 97/37273  10/1997  (WO).
WO 97/37274  10/1997  (WO).
WO 98/01789  1/1998   (WO).

OTHER PUBLICATIONS

Derwnet 180358, 1999.*

Andrey Dyaduysha, et al., Jpn. J. Appl. Phys., vol. 34, pp. L 1000 to L 1002, "Peculiarity of an Oblique Liquid Crystal Alignment Induced by a Photosensitive Orientant", Aug. 1, 1995.

Oleg Yaroshchuk, et al., Jpn. J. Appl. Phys., vol. 36, pp. 5693 to 5695, "Photosensitive Materials on a Base of Polysiloxane for the Alignment of Nematic Liquid Crystals", Sep. 1997.

Derwent Abstract, JP 8–015 707, Jan. 19, 1996.

* cited by examiner

*Primary Examiner*—Shean C. Wu
(74) *Attorney, Agent, or Firm*—Oblon, Spivak, McClelland, Maier & Neustadt, P.C.

(57) ABSTRACT

A liquid crystal aligning agent composed of a polymer containing a moiety having two aromatic nuclei and an ethylene carbonyl group therebetween. The liquid crystal aligning agent is converted to a liquid crystal alignment film by irradiation a thin film of the agent with a linearly polarized ray.

37 Claims, No Drawings

LIQUID CRYSTAL ALIGNING AGENT AND PROCESS FOR PRODUCING LIQUID CRYSTAL ALIGNMENT FILM USING THE SAME

BACKGROUND OF THE INVENTION

1. Field of the Invention

This invention relates to a liquid crystal aligning agent and to a process for producing a liquid crystal alignment film using the same. More specifically, it relates to a liquid crystal aligning agent which is used for the formation of a liquid crystal alignment film and capable of having liquid crystal alignment properties by exposure to linearly polarized radiation without carrying out a rubbing treatment and to a process for producing a liquid crystal alignment film using the same.

2. Description of the Background

There have been known liquid crystal display devices having TN (twisted nematic) type and STN (super twisted nematic) type liquid crystal cells in which nematic liquid crystals having positive dielectric anisotropy are sandwiched between substrates provided with transparent electrodes having a liquid crystal alignment film and the major axis of a liquid crystal molecule is continuously twisted at an angle of 90° or more between the substrates.

Means for aligning liquid crystals in the above liquid crystal cell include a method (rubbing treatment) in which an organic film is formed on the surface of a substrate and the surface of the organic film is rubbed with a cloth of rayon or the like in one direction to provide liquid crystal alignment properties, a method in which silicon oxide is vapor deposited obliquely on the surface of a substrate, a method in which a monomolecular film having a long-chain alkyl group is formed by Langmuir-Blodgett's technique (LB technique), and the like. However, as the size of a substrate to be treated is restricted and the alignment uniformity of liquid crystals is unsatisfactory in these means, it is general that the alignment by rubbing of liquid crystals, which is advantageous in terms of treatment time and treatment cost, is industrially employed.

The alignment by rubbing of liquid crystals, however, has a problem that dust and static electricity are ready to be generated during the processing. When static electricity is generated, dust is adhered to the surface of the alignment film, thereby causing a display defect. In the case of a substrate having TFT (thin film transistor) devices, the circuit destruction of the TFT devices is caused by the generated static electricity, thereby reducing yield. Further, a liquid crystal display device whose pixel pattern will become finer and finer in the future has a problem in rubbing uniformity because the substrate has surface irregularities due to an increase in the density of pixels.

It is therefore an object of the present invention to provide a novel liquid crystal aligning agent.

It is another object of the present invention to provide a liquid crystal aligning agent of which the alignment of liquid crystals can be controlled with ease, and which does not produce static electricity and dust, can be mass-produced and is used to form a liquid crystal alignment film.

It is still another object of the present invention to provide a process for producing a liquid crystal alignment film using the liquid crystal aligning agent of the present invention.

Other objects and advantages of the present invention will become apparent from the following description.

According to the present invention, firstly, the above objects and advantages of the present invention can be attained by a liquid crystal aligning agent which is composed of a polymer comprising at least one moiety selected from the group consisting of a moiety represented by the following formula (1):

$$-P^1-CR^1=CR^2-CO-Q^1- \qquad (1)$$

wherein $P^1$ and $Q^1$ are independently a divalent organic group having an aromatic ring, and $R^1$ and $R^2$ are independently a hydrogen atom or an alkyl group, a moiety represented by the following formula (2):

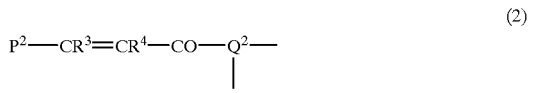

$$P^2-CR^3=CR^4-CO-Q^2- \qquad (2)$$

wherein $P^2$ is a monovalent organic group having an aromatic ring, $Q^2$ is a trivalent organic group having an aromatic ring, and $R^3$ and $R^4$ are independently a hydrogen atom or an alkyl group, a moiety represented by the following formula (3):

$$P^3-CR^5=CR^6-CO-Q^3- \qquad (3)$$

wherein $P^3$ is a monovalent organic group having an aromatic ring, $Q^3$ is a divalent organic group having an aromatic ring, and $R^5$ and $R^6$ are independently a hydrogen atom or an alkyl group, a moiety represented by the following formula (4):

$$-P^4-CR^7=CR^8-CO-Q^4 \qquad (4)$$

wherein $P^4$ is a divalent organic group having an aromatic ring, $Q^4$ is a monovalent organic group having an aromatic ring, and $R^7$ and $R^8$ are independently a hydrogen atom or an alkyl group, and a moiety represented by the following formula (5):

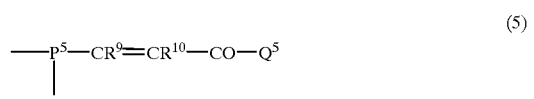

$$-P^5-CR^9=CR^{10}-CO-Q^5 \qquad (5)$$

wherein $P^5$ is a trivalent organic group having an aromatic ring, $Q^5$ is a monovalent organic group having an aromatic ring, and $R^9$ and $R^{10}$ are independently a hydrogen atom or an alkyl group.

The present invention will be described in detail hereinafter.

Liquid Crystal Aligning Agent

The liquid crystal aligning agent of the present invention is composed of a polymer comprising a moiety represented by any one of the above formulas (1), (2), (3), (4) and (5). These moieties are sensitive to radiation. The term "sensitive" as used herein means that when the moiety is exposed to radiation, the energy level of the moiety is increased by a photochemical excitation and then the moiety releases its energy to return to a stable state.

The moieties represented by the above formulas (1), (2), (3), (4) and (5) are common in that they have a conjugated enone structure (to be referred to as "specific structure" hereinafter).

In the above formula (1), $P^1$ and $Q^1$ are independently a divalent organic group having an aromatic ring, preferably an organic group having 6 to 20 carbon atoms. The organic group may contain a halogen atom. Illustrative examples of the organic group include 1,2-phenylene group, 1,3-phenylene group, 1,4-phenylene group, 4,4'-biphenylene group and the like.

In the above formula (1), $R^1$ and $R^2$ are independently a hydrogen atom or an alkyl group, preferably a hydrogen atom or an alkyl group having 1 to 6 carbon atoms. The alkyl group may be straight-chain or branched-chain. Illustrative examples of the alkyl group include methyl group, ethyl group, n-propyl group, isopropyl group, n-butyl group, isobutyl group, sec-butyl group, t-butyl group, n-pentyl group, n-hexyl group and the like.

In the above formula (2), $P^2$ is a monovalent organic group having an aromatic ring, preferably an organic group having 6 to 20 carbon atoms. The organic group may contain a halogen atom. Illustrative examples of the organic group include 4-pentylphenyl group, 4-fluorophenyl group, 3,4-difluorophenyl group, 3,4,5-trifluorophenyl group, 4-octylphenyl group, 4-pentylbiphenyl group, 4-octylbiphenyl group, 4-fluorobiphenyl group, 3,4-difluorobiphenyl group, 3,4,5-trifluorobiphenyl group, 4-octyl-1-naphthyl group, 5-pentyl-1-naphthyl group, 6-octyl-2-naphthyl group, 9-anthracenyl group, 10-pentyl-9-anthracenyl group and the like.

In the above formula (2), $Q^2$ is a trivalent organic group having an aromatic ring, preferably an organic group having 6 to 20 carbon atoms. The organic group may contain a halogen atom. Illustrative examples of the organic group include groups represented by the following formulas.

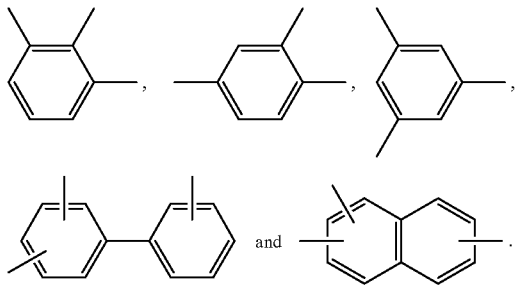

In the above formula (2), $R^3$ and $R^4$ are independently a hydrogen atom or an alkyl group. Illustrative examples of the alkyl group are the same as those listed for $R^1$ and $R^2$ in the above formula (1).

In the above formula (3), $P^3$ is a monovalent organic group having an aromatic ring, preferably an organic group having 6 to 20 carbon atoms. The organic group may contain a halogen atom. Illustrative examples of the organic group are the same as those listed for $P^2$ in the above formula (2).

In the above formula (3), $Q^3$ is a divalent organic group having an aromatic ring, preferably an organic group having 6 to 20 carbon atoms. The organic group may contain a halogen atom. Illustrative examples of the organic group are the same as those listed for $Q^1$ in the above formula (1).

In the above formula (3), $R^5$ and $R^6$ are independently a hydrogen atom or an alkyl group. Illustrative examples of the alkyl group are the same as those listed for $R^1$ and $R^2$ in the above formula (1).

In the above formula (4), $P^4$ is a divalent organic group having an aromatic ring, preferably an organic group having 6 to 20 carbon atoms. The organic group may contain a halogen atom. Illustrative examples of the organic group are the same as those listed for $Q^1$ in the above formula (1).

In the above formula (4), $Q^4$ is a monovalent organic group having an aromatic ring, preferably an organic group having 6 to 20 carbon atoms. The organic group may contain a halogen atom. Illustrative examples of the organic group are the same as those listed for $P^2$ in the above formula (2).

In the above formula (4), $R^7$ and $R^8$ are independently a hydrogen atom or an alkyl group. Illustrative examples of the alkyl group are the same as those listed for $R^1$ and $R^2$ in the above formula (1).

In the above formula (5), $P^5$ is a trivalent organic group having an aromatic ring, preferably an organic group having 6 to 20 carbon atoms. The organic group may contain a halogen atom. Illustrative examples of the organic group are the same as those listed for $Q^2$ in the above formula (2).

In the above formula (5), $Q^5$ is a monovalent organic group having an aromatic ring, preferably an organic group having 6 to 20 carbon atoms. The organic group may contain a halogen atom. Illustrative examples of the organic group are the same as those listed for $P^2$ in the above formula (2).

In the above formula (5), $R^9$ and $R^{10}$ are independently a hydrogen atom or an alkyl group. Illustrative examples of the alkyl group are the same as those listed for $R^1$ and $R^2$ in the above formula (1).

Of the moieties having the above specific structure, a moiety represented by the following formula (4)-1 which belongs to the above formula (4):

wherein $P^4$ and $Q^4$ are the same as defined in the above formula (4), and a moiety represented by the following formula (5)-1 which belongs to the above formula (5):

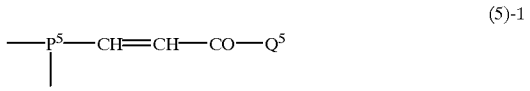

wherein $P^5$ and $Q^5$ are the same as defined in the above formula (5), are preferred.

A polymer having either one of the moieties represented by the above formulas (4)-1 and (5)-1 is particularly preferred because a photo-reaction thereof proceeds even with ultraviolet light having a long wavelength of 320 nm or more which rarely causes the deterioration of an alignment film and a liquid crystal alignment film having excellent heat resistance can be obtained therefrom.

The polymer constituting the liquid crystal aligning agent of the present invention is a polymer having the above specific structure in the main chain or side chain. The skeleton of the polymer is not particularly limited but is preferably selected from (1) polyimides, (2) polyesters, (3) polyamides and (4) poly(meth)acrylates. The polyimide is preferable in view of its excellent heat resistance. A description is first given of the polyimides (1) and subsequently of other polymers.

The above polyimide (1) is obtained through a polyamic acid, as an intermediate, produced by reacting (a) tetracarboxylic dianhydride with (b) a diamine compound. The polyimide used in the present invention is a compound comprising (a) a tetracarboxylic dianhydride component and (b) a diamine compound component, at least one of which has the above specific structure.

Illustrative examples of the tetracarboxylic dianhydride having the above specific structure include 3,3',4,4'-chalcone tetracarboxylic dianhydride, 4,4',5,5'-chalcone tetracarboxylic dianhydride, 3,3',4,5'-chalcone tetracarboxylic dianhydride, 4,4'-dihydroxychalcone bistrimellitate, 3,4'-dihydroxychalcone bistrimellitate, 3',5'-dihydroxychalcone bistrimellitate, 2,4-dihydroxychalcone bistrimellitate, 2,2'-bis(4-chalconyloxy)-3,3',4,4'-biphenyltetracarboxylic dianhydride, 3,3'-bis(4-chalconyloxy)-4,4',5,5'-biphenyltetracarboxylic dianhydride, 2,2'-bis(4-chalconyloxy)-4,4',5,5'-biphenyltetracarboxylic dianhydride, 4,4'-bis(4-chalconyloxy)-2,2',3,3'-biphenyltetracarboxylic dianhydride, 6,6'-bis(4-chalconyloxy)-2,2',3,3'-biphenyltetracarboxylic dianhydride, 5,5'-bis(4-chalconyloxy)-2,2',3,3'-biphenyltetracarboxylic dianhydride, 2,2'-bis(4-chalconyloxy)-3,3',4,4'-diphenylether tetracarboxylic dianhydride, 3,3'-bis(4-chalconyloxy)-4,4',5,5'-diphenylether tetracarboxylic dianhydride, 2,2'-bis(4-chalconyloxy)-4,4',5,5'-diphenylether tetracarboxylic dianhydride, 4,4'-bis(4-chalconyloxy)-2,2',3,3'-diphenylether tetracarboxylic dianhydride, 6,6'-bis(4-chalconyloxy)-2,2',3,3'-diphenylether tetracarboxylic dianhydride, and 5,5'-bis(4-chalconyl)-2,2',3,3'-diphenylether tetracarboxylic dianhydride.

Illustrative examples of the diamine compound having the specific structure include 3,3'-diaminochalcone, 4,4'-diaminochalcone, 3,4'-diaminochalcone, 2,3-diaminochalcone, 2,4-diaminochalcone, 3,4-diaminochalcone, 3,5-diaminochalcone, 4-(2,4-diaminophenoxy)chalcone, 4-(3,5-diaminophenoxy)chalcone, 4'-(2,4-diaminophenoxy)chalcone, and compounds represented by the following formulas (6) and (7):

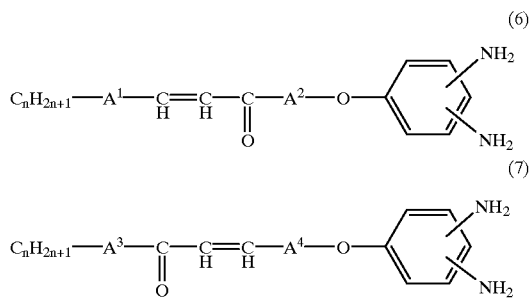

wherein $A^1$, $A^2$, $A^3$ and $A^4$ are each a divalent aromatic group, and n is an integer of 1 to 10.

Of these compounds, compounds represented by the above formulas (6) and (7) are preferred, and a compound represented by the above formula (7) is particularly preferred. In the above formulas (6) and (7), an alkyl group represented by $C_nH_{2n+1}$— may be straight-chain or branched-chain but preferably straight-chain. Illustrative examples of the divalent aromatic group represented by $A^1$, $A^2$, $A^3$ and $A^4$ include phenylene group, biphenylene group, naphthylene group, binaphthylene group, anthrylene group, phenanthrylene group and organic groups obtained by removing two hydrogen atoms from polycyclic aromatic compounds such as pyrene, chrysene and naphthacene.

Illustrative examples of the compound represented by the above formula (6) include 4-isopropyl-4'(3,5-diaminophenoxy)chalcone, 4-amyl-4'(3,5-diaminophenoxy)chalcone, 4-pentyl-4'(3,5-diaminophenoxy)chalcone, 4-octyl-4'(3,5-diaminophenoxy)chalcone, 4-pentyl-2-methyl-4'(2,4-diaminophenoxy)chalcone, 4-pentyl-2,5-dimethyl-4'(3,5-diaminophenoxy)chalcone, 4-octyl-2-methyl-4'(3,5-diaminophenoxy)chalcone, 4-pentyl-4'(2,4-diaminophenoxy)chalcone, 4-octyl-4'(2,4-diaminophenoxy)chalcone, 4-pentyl-4'(3,5-diaminobenzoyloxy)chalcone, 4-octyl-4'(3,5-diaminobenzoyloxy)chalcone, 4-pentyl-3'(2,4-diaminobenzoyloxy)chalcone, 4-octyl-3'(2,4-diaminobenzoyloxy)chalcone and the like. Of these, 4-pentyl-4'(3,5-diaminophenoxy)chalcone and 4-octyl-4'(3,5-diaminophenoxy)chalcone are particularly preferred.

Illustrative examples of the compound represented by the above formula (7) include 4-(3,5-diaminophenoxy)-4'-isopropylchalcone, 4-(3,5-diaminophenoxy)-4'-pentylchalcone, 4-(3,5-diaminophenoxy)-4'-pentylchalcone, 4-(3,5-diaminophenoxy)-4'-octylchalcone, 4-(2,4-diaminophenoxy)-4'-pentylchalcone, 4-(2,4-diaminophenoxy)-4'-octylchalcone, 4-(3,5-diaminobenzoyloxy)-4'-pentylchalcone and 4'-(4-pentylphenyl)-4(3,5-diaminophenoxy)chalcone are particularly preferred.

They can be used alone or in combination of two or more.

The polyimide used in the present invention can be used in conjunction with other tetracarboxylic dianhydride and/or diamine compound in limits not prejudicial to the effect of the present invention.

Illustrative examples of the other tetracarboxylic dianhydride include aliphatic and alicyclic tetracarboxylic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofuran tetracarboxylic dianhydride, 1,3,3a,4,5,9b-hexahydro-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride, bicyclo[2.2.2]-octo-7-ene-2,3,5,6-tetracarboxylic dianhydride and the like; and aromatic tetracarboxylic dianhydrides such as pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3'4,4'-tetraphenylsilane tetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy) diphenylpropane dianhydride, 3,3',4,4'-perfluoroisopropylidene tetracarboxylic dianhydride, 3,3',4,4'-biphenyltetracarboxylic dianhydride, bis(phthalic acid)phenylphosphine oxide dianhydride, p-phenylene-bis (triphenylphthalic acid) dianhydride, m-phenylene-bis (triphenylphthalic acid) dianhydride, bis(triphenylphthalic acid)-4,4'-diphenylether dianhydride, bis(triphenylphthalic acid)-4,4'-diphenylmethane dianhydride, and the like.

Of these, 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride and 3,3',4,4'-biphenylether tetracarboxylic dianhydride are preferred. They can be used alone or in combination of two or more.

Illustrative examples of the other diamine compound include aromatic diamines such as p-phenylenediamine, m-phenylenediamine, 4,4'-diaminodiphenyl methane, 4,4'-diaminodiphenyl ethane, 4,4'-diaminodiphenyl sulfide, 4,4'- diaminodiphenyl sulfone, 3,3'-dimethyl-4,4'-diaminobiphenyl, 4,4'-diaminobenzanilide, 4,4'-diaminodiphenyl ether, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 2,2-bis(4-aminophenoxy)propane, 2,2-bis[4-(4-aminophenoxy)phenyl]propane, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl, and the like; aromatic diamines having a hetero atom such as diaminotetraphenyl thiophene and the like; aliphatic and alicyclic diamines such as 1,1-metaxylene diamine, 1,3-propane diamine, tetramethylene diamine, pentamethylene diamine, hexamethylene diamine, heptamethylene diamine, octamethylene diamine, nonamethylene diamine, 4,4-diaminoheptamethylene diamine, 1,4-diaminocyclohexane, isophorone diamine, tetrahydrodicyclopentadienylene diamine, hexahydro-4,7-methanoindanylene dimethylene diamine, tricyclo[6.2.1.0$_{2.7}$]-undecylene dimethyl diamine, 4,4'-methylenebis(cyclohexylamine) and the like; and diaminoorganosiloxanes such as diaminohexamethyl disiloxane and the like.

Of these, p-phenylene diamine, 4,4'-diaminodiphenylmethane, 1,5-diaminonaphthalene, 2,7-diaminofluorene, 4,4'-diaminodiphenyl ether, 4,4'-(p-phenyleneisopropylidene)bisaniline, 2,2-bis[4-(4-aminophenoxy)phenyl]hexafluoropropane, 2,2-bis(4-aminophenyl)hexafluoropropane, 2,2'-bis[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]-octafluorobiphenyl are preferred. They can be used alone or in combination of two or more.

The polyimide used in the present invention can be obtained by polycondensing (a) the above tetracarboxylic dianhydride component and (b) the diamine component to produce a polyamic acid, and heating the polyamic acid, optionally in the presence of a dehydrating agent and an imidizing catalyst, to imidize the polyamic acid. The reaction temperature for imidization by heating is generally 60 to 300° C., preferably 100 to 170° C. When the reaction temperature is below 60° C., the reaction proceeds slow, while when the temperature is above 300° C., the molecular weight of the polyamic acid may greatly lower. The reaction for imidization in the presence of the dehydrating agent and the imidizing catalyst can be carried out in an organic solvent. The reaction temperature is generally 0 to 180° C., preferably 60 to 150° C. The dehydrating agent is an acid anhydride such as acetic anhydride, propionic anhydride or trifluoroacetic anhydride. The imidizing catalyst is, for example, a tertiary amine such as pyridine, collidine, lutidine or triethylamine. However, the catalyst is not limited to these. The amount of the dehydrating agent used is preferably 1.6 to 20 mol per 1 mole of the recurring units of the polyamic acid. The amount of the imidizing catalyst used is preferably 0.5 to 10 mol per 1 mole of the dehydrating agent used. The content of the amic acid units in the polyimide can be adjusted by the amount of the imidizing catalyst and the amount of the dehydrating agent.

The above polyester (2) is obtained by reacting (c) a dicarboxylic acid (i.e., dicarboxylic acid, dicarboxylic acid ester or dicarboxylic acid halide) and (d) a diol compound. The polyester used in the present invention is a compound comprising (c) a dicarboxylic acid component and (d) a diol compound component, at least one of which has the above specific structure.

Illustrative examples of the dicarboxylic acid having the specific structure include chalcone-3,3'-dicarboxylic acid, chalcone-3,4'-dicarboxylic acid, chalcone-4,4'-dicarboxylic acid, 2,3-chalconedicarboxylic acid, 2,4-chalconedicarboxylic acid, 2,5-chalconedicarboxylic acid, 3,4-chalconedicarboxylic acid, 3,5-chalconedicarboxylic acid, 1-(4-chalconyloxy)-2,4-benzenedicarboxylic acid, 1-(4-chalconyloxy)-2,5-benzenedicarboxylic acid, 1-(4-chalconyloxy)-2,6-benzenedicarboxylic acid, 1-(4-chalconyloxy)-3,5-benzenedicarboxylic acid and ester compounds of alkyl esters thereof, carboxylic acid halides such as carboxylic acid chloride and the like.

Illustrative examples of the diol compound having the specific structure include, 3,3'-dihydroxychalcone, 4,4'-dihydroxychalcone, 3,4'-dihydroxychalcone, 4,4'-dihydroxychalcone, 2,3-dihydroxychalcone, 2,4-dihydroxychalcone, 2,5-dihydroxychalcone, 3,4-dihydroxychalcone, 3,5-dihydroxychalcone, 1-(4-chalconyloxy)-2,4-benzenediol, 1-(4-chalconyloxy)-2,5-benzenediol, 1-(4-chalconyloxy)-2,6-benzenediol and 1-(4-chalconyloxy)-3,5-benzenediol and the like.

Of these, chalcone-4,4'-dicarboxylic acid, 4,4'-dihydroxychalcone, 1-(4-chalconyloxy)-3,5-benzenedicarboxylic acid and 1-(4-chalconyloxy)-3,5-benzenediol are preferred. They can be used alone or in combination of two or more.

The polyester used in the present invention can be used in conjunction with other dicarboxylic acid and/or diol compound in limits not prejudicial to the effect of the present invention.

Illustrative examples of the other dicarboxylic acid compound include aliphatic carboxylic acids such as oxalic acid, malonicacid, difluoromalonicacid, alkylmalonic acid, succinic acid, tetrafluorosuccinic acid, alkylsuccinic acid, (±)-malic acid, meso-tartaric acid, itaconic acid, maleic acid, methylmaleic acid, fumaric acid, methylfumaric acid, acetylenedicarboxylic acid, glutaric acid, hexafluoroglutaric acid, methylglutaric acid, glutaconic acid, adipic acid, dithioadipic acid, methyladipic acid, dimethyladipic acid, tetramethyladipic acid, methyleneadipic acid, muconic acid, galactaric acid, pimelic acid, suberic acid, perfluorosuberic acid, 3,3,6,6-tetramethylsuberic acid, azelaic acid, sebacic acid, perfluorosebacic acid, brassylic acid, dodecyldicarboxylic acid, tridecyldicarboxylic acid and tetradecyldicarboxylic acid; alicyclic carboxylic acids such as cycloalkyldicarboxylic acid, adipic acid, hexahydrophthalic acid, 1,4-(norbornene) dicarboxylic acid, bicycloalkyldicarboxylic acid, adamantanedicarboxylic acid and spiroheptanedicarboxylic acid; aromatic dicarboxylic acids such as phthalic acid, isophthalic acid, dithiophthalic acid, methylisophthalic acid, dimethylisophthalic acid, chloroisophthalic acid, dichloroisophthalic acid, terephthalic acid, methylterephthalic acid, dimethylterephthalic acid, chloroterephthalic acid, bromoterephthalic acid, naphthalenedicarboxylic acid, oxofluorenedicarboxylic acid, anthracenedicarboxylic acid, biphenyldicarboxylic acid, biphenylenedicarboxylic acid, dimethylbiphenylenedicarboxylic acid, 4,4"-p-terephenylenedicarboxylic acid, bibenzyldicarboxylic acid, azobenzenedicarboxylic acid, homophthalic acid, phenylenediacetic acid, phenylenedipropionic acid, naphthalenediacetic acid, naphthalenedipropionic acid, biphenyldiacetic acid, biphenyldipropionic acid, 3,3'-[4,4'-(methylenedi-p-biphenylene)]dipropionic acid, 4,4'-bibenzyldiacetic acid, 3,3'-(4,4'-bibenzyl)dipropionic acid, oxydi-p-phenylenediacetic acid, and the like. Ester compounds such as alkyl esters of the above acids and carboxylic acid halides such as carboxylic acid chloride may be also used. They can be used alone or in combination of two or more.

Illustrative examples of the other diol compound include polyvalent phenols such as catechol, alkylcatechol, hydroquinone and the like; and bisphenols such as methylene bisphenol, isopropylidene bisphenol, butylidene bisphenol, thiobisphenol, sulfinylbisphenol, sulfonylenebisphenol, oxybisphenol and the like. They can be used alone or in combination of two or more.

The polyester used in the present invention is obtained by heating the above dicarboxylic acid component (c) and the above diol compound component (d), in the presence of a catalyst as required, to conduct the polycondensation thereof. A protic acid such as sulfuric acid or p-toluenesulfonic acid, an oxide or salt of heavy metals, or an organometal compound of a metal such as titanium, tin or lead is used as the catalyst for the polycondensation of a dicarboxylic acid and a diol compound. In the case of a reaction between a dicarboxylic acid ester and a diol compound, an acetate or carbonate compound of lead, zinc, manganese, calcium, cobalt or cadmium, or an oxide of metal magnesium, zinc, lead, antimony or germanium is used as the catalyst. In the case of a reaction between a halide of a dicarboxylic acid and a diol compound, a basic catalyst such as pyridine or triethylamine is used as the catalyst.

The polyamide (3) is obtained by reacting (e) a dicarboxylic acid (i.e., dicarboxylic acid, dicarboxylic acid ester or dicarboxylic acid halide) and (f) a diamine compound. The polyamide used in the present invention is a compound comprising (e) a dicarboxylic acid component and (f) a diamine compound component, at least one of which has the specific structure.

Illustrative examples of the dicarboxylic acid having the specific structure are the same as those listed for the dicarboxylic acid (c). Illustrative examples of the diamine compound having the specific structure are the same as those listed for the diamine compound (b). They can be used alone or in combination of two or more.

The polyamide used in the present invention can be used in conjunction with other dicarboxylic acid compound and diamine compound in limits not prejudicial to the effect of the present invention. Illustrative examples of the other dicarboxylic acid compound and diamine compound are the same as those listed above. They can be used alone or in combination of two or more.

The polyamide used in the present invention is obtained by polycondensing (e) the above dicarboxylic acid component and (f) the above diamine component, in the presence of an acidic catalyst such as p-toluenesulfonic acid, sulfuric acid or hydrochloric acid as required.

The above poly(meth)acrylate (4) is obtained by polymerizing (g) a (meth)acrylate compound. The poly(meth) acrylate used in the present invention is (g) a (meth)acrylate compound having the specific structure.

Illustrative examples of the (meth)acrylate compound having the specific structure include 4'-(meth)acryloyloxychalcone, 4-phenyl-4'-(meth)acryloyloxychalcone, 4-pentyl-4'-(meth)acryloyloxychalcone, 4-(4-pentylphenyl)-4'-(meth)acryloyloxychalcone, 4-(meth)acryloyloxychalcone, 4-(meth)acryloyloxy-4'-phenylchalcone, 4-(meth)acryloyloxy-4'-pentylchalcone, 4-(meth)acryloyloxy-4'-(4-pentylphenyl)chalcone and the like. They can be used alone or in combination of two or more.

The poly(meth)acrylate used in the present invention can be used in conjunction with other (meth) acrylate compound in limits not prejudicial to the effect of the present invention.

Illustrative examples of the other (meth)acrylate compound include aliphatic (meth)acrylate compounds such as methyl (meth)acrylate, ethyl (meth)acrylate, n-butyl (meth)acrylate, i-butyl (meth)acrylate, 2-hydroxyethyl (meth)acrylate, 2-hydroxypropyl (meth)acrylate, 2-ethylhexyl (meth)acrylate, polyethylene glycol mono(meth)acrylate, trimethylolpropane tri(meth)acrylate and the like; alicyclic (meth)acrylate compounds such as tetrahydrofurfuryl (meth)acrylate, cyclohexyl (meth)acrylate, glycidyl (meth)acrylate, dicyclopentadiene (meth)acrylate, dicyclopentanyl (meth)acrylate, tricyclodecanyl (meth)acrylate, isobornyl (meth)acrylate and the like; aromatic (meth)acrylate compounds such as benzyl (meth)acrylate, 2-hydroxy-3-phenyloxypropyl (meth)acrylate, tris(2-hydroxyethyl) isocyanurate tri(meth)acrylate and the like. They can be used alone or in combination of two or more.

The poly(meth)acrylate used in the present invention is obtained by polymerizing (g) the above (meth)acrylate compound in the presence of a catalyst such as an azo compound exemplified by azobisisobutyronitrile or a peroxide exemplified by benzoyl peroxide as required.

Solvent

The liquid crystal aligning agent of the present invention comprises a solution of a polymer containing an organic compound sensitive to the above radiation. As a solvent for preparation of the above solution, any solvent is acceptable if it is an organic solvent capable of dissolving the polymer. When a polyimide is used, the solvent is selected from aprotic polar solvents such as N-methyl-2-pyrrolidone, N,N-dimethylacetamide, N,N-dimethylformamide, dimethylsulfoxide, γ-butyrolactone, tetramethyl urea, hexamethylphosphortriamide and the like; and phenolic solvents such as m-cresol, xylenol, phenol, phenol halide and the like. They can be used alone or in combination of two or more. A poor solvent for the used polymer can be used in conjunction with the above solvent in such an amount that the polymer is not precipitated.

Other Additives

The liquid crystal aligning agent used in the present invention can contain a variety of thermosetting crosslinking agents to improve the stabilization of pretilt angle and the strength of a coating film. A polyfunctional epoxy containing compound is effective as the thermosetting crosslinking agent, and is selected from bisphenol A type epoxy resins, phenolic novolak type epoxy resins, cresol novolak type epoxy resins, alicyclic epoxy resins, glycidyl ester-based epoxy resins, glycidyl diamine-based epoxy resins, heterocyclic epoxy resins, epoxy group-containing acrylic resins and the like. Commercially available products thereof include Epolight 400E and Epolight 3002 (products of Kyoeisha Chemical Co., Ltd.), Epicoat 828, Epicoat 152 and Epoxy Novolak 180S (products of Yuka Shell Epoxy Co., Ltd) and the like.

Further, when the above polyfunctional epoxy containing compound is used, a basic catalyst such as 1-benzyl-2-methylimidazole or the like can be added to cause a crosslinking reaction efficiently.

The liquid crystal aligning agent of the present invention can contain a functional silane containing compound in order to improve adhesion thereof to a substrate. Illustrative examples of the functional silane containing compound include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyl dimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylene triamine, N-trimethoxysilylpropyltriethylene triamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, and the like. In addition thereto, a reaction product between a tetracarboxylic dianhydride and an amino group-containing silane compound, as disclosed in the unexamined published Japanese patent application No. 63-291922 (291922/1988), is also usable.

Liquid Crystal Alignment Film

A liquid crystal alignment film in which the liquid crystal aligning agent of the present invention is used can be produced, for example, as follows. The liquid crystal aligning agent of the present invention is first applied to a transparent conductive film side of a substrate having the transparent conductive film by a roll coating, spinner coating, printing or the like, and heated at a temperature of 40 to 200° C. to form a coating film. The thickness of the coating film is generally 0.001 to 1 µm, preferably 0.005 to 0.5 µm.

The transparent substrate is made from glass such as float glass or soda glass, or a plastic film of polyethylene terephthalate, polybutylene terephthalate, polyether sulfone, polycarbonate or the like.

The transparent conductive film is an NESA film made from $SnO_2$, ITO film made from $In_2O_3$—$SnO_2$, or the like. The patterning of the transparent conductive film is carried out by a photo etching, a method using a mask or the like.

When the liquid crystal aligning agent is coated, a functional silane-containing compound, titanate or the like can be applied to the substrate and the transparent conductive film in advance to further improve the adhesion of the coating film to the substrate and the transparent conductive film.

Thereafter, the coating film is exposed to linearly polarized radiation and if necessary, further heated at 150 to 250° C. to provide liquid crystal alignment properties. The radiation used is generally ultraviolet light or visible light having a wavelength of 150 to 800 nm, preferably ultraviolet light having a wavelength of 240 to 450 nm, particularly preferably ultraviolet light having a wavelength of 320 to 450 nm.

The light source is a low-pressure mercury lamp, high-pressure mercury lamp, deuterium lamp, metal halide lamp, argon resonance lamp, xenon lamp, excimer laser or the like. The above ultraviolet light having particularly preferred wavelength range can be obtained by such means as a combination of the above light source with a filter, a diffraction grating or the like. For simplicity, a polarizer made from pyrex glass that is impervious to ultraviolet light having a wavelength shorter than 320 nm may be used in combination with the above light source.

Liquid Crystal Display Device

A liquid crystal display device formed using the liquid crystal aligning agent of the present invention can be produced by placing two substrates having the above liquid crystal alignment film to face each other in such a manner that the polarizing directions of the linearly polarized radiation irradiated to the liquid crystal alignment films make a predetermined angle, sealing the periphery of a gap between the substrates with a sealing agent, filling a liquid crystal into the gap and stopping an injection port to form a liquid crystal cell. And, polarizers are stuck on both sides of the liquid crystal cell in such a manner that the polarizing direction of each of the polarizers makes a predetermined angle with the polarizing direction of the linearly polarized radiation irradiated to the liquid crystal alignment film of each of the substrates to form a liquid crystal display device. A desired liquid crystal display device having a TN type or STN type liquid crystal cell can be obtained by adjusting an angle made by the polarizing direction of the linearly polarized radiation irradiated to each of the two substrates having the liquid crystal alignment film and an angle formed by each of the substrates and each of the polarizers.

The above sealing agent is, for example, an epoxy resin containing a hardener and aluminum oxide particles as a spacer, or the like.

The liquid crystal is a nematic liquid crystal or smectic liquid crystal. In the case of an TN type liquid crystal cell, a liquid crystal capable of forming a nematic liquid crystal is used, such as Schiff base-based liquid crystal, azoxy-based liquid crystal, biphenyl-based liquid crystal, phenylcyclohexane-based liquid crystal, ester-based liquid crystal, terphenyl-based liquid crystal, biphenylcyclohexane-based liquid crystal, pyrimidine-based liquid crystal, dioxane-based liquid crystal, bicyclooctane-based liquid crystal, cubane-based liquid crystal and the like. In the case of an STN liquid crystal cell, cholesteric liquid crystals such as cholestyl chloride, cholesteryl nonanoate, and cholesteryl carbonate, chiral agents such as CB-15 and CB-15 (trade names, products of Merck Co., Ltd) and the like can be added to the above liquid crystals. Further, ferroelectric liquid crystals such as p-decyloxybenzilidene-p-amino-2-methylbutylcinnamate can be used.

The polarizer used on the exterior side of the liquid crystal cell is a polarizer produced by interposing between cellulose acetate protective films a polarizing film having iodine adsorbed, which is called H film, while stretching and orienting a polyvinyl alcohol, or a polarizer composed of the H film itself.

When a liquid crystal alignment film is formed by the above process using the liquid crystal aligning agent of the present invention, adhesion of dust and the circuit destruction of a TFT device caused by static electricity which is generated by rubbing treatment of the prior art do not occur, thereby making it possible to form a liquid crystal alignment film at a high yield.

The following examples are provided for the purpose of further illustrating the present invention but are in no way to be taken as limiting.

SYNTHESIS EXAMPLE 1
(Polymerization of Polyamic Acid)

0.1 mol (22.4 g) of 2,3,5-tricarboxycyclopentylacetic dianhydride and 0.1 mol (47.6 g) of 4(4-pentylphenyl)-4'(3,5-diaminophenoxy)chalcone were dissolved in 400 g of N-methyl-2-pyrrolidone, and allowed to react with each other at 60° C. for 6 hours.

Then, the reaction mixture was poured into a large excess of methanol to precipitate a reaction product. Thereafter, the reaction product was washed with methanol and dried at 40° C. under reduced pressure for 15 hours to obtain a polymer 1a (65 g).

(Imidization Reaction)

300 Grams of N-methyl-2-pyrrolidone, 8.2 g of pyridine and 9.6 g of acetic anhydride were added to 15.0 g of the obtained polymer 1a to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer 1b (11.5 g).

SYNTHESIS EXAMPLE 2
(Polymerization of Polyamic Acid)

0.1 mol (22.4 g) of 2,3,5-tricarboxycyclopentylacetic dianhydride, 0.05 mol (5.4 g) of p-phenylenediamine and 0.05 mol (16.5 g) of 4'(3,5-diaminophenoxy)chalcone were dissolved in 350 g of N-methyl-2-pyrrolidone, and allowed to react with one another at 60° C. for 6 hours.

Then, the reaction mixture was poured into a large excess of methanol to precipitate a reaction product. Thereafter, the reaction product was washed with methanol and dried at 40° C. under reduced pressure for 15 hours to obtain a polymer 2a (43 g).

(Imidization Reaction)

320 Grams of N-methyl-2-pyrrolidone, 8 g of pyridine and 10 g of acetic anhydride were added to 20.0 g of the obtained polymer 2a to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer 2b (15 g).

SYNTHESIS EXAMPLE 3
(Polymerization of Polyamic Acid)

0.1 mol (22.4 g) of 2,3,5-tricarboxycyclopentylacetic dianhydride and 0.1 mol (23.8 g) of 4,4'-diaminochalcone were dissolved in 400 g of N-methyl-2-pyrrolidone, and allowed to react with each other at 60° C. for 6 hours.

The reaction mixture was then poured into a large excess of methanol to precipitate a reaction product. Thereafter, the reaction product was washed with methanol and dried at 40° C. under reduced pressure for 15 hours to obtain a polymer 3a (38 g).

(Imidization Reaction)

380 Grams of N-methyl-2-pyrrolidone, 8 g of pyridine and 10 g of acetic anhydride were added to 20.0 g of the obtained polymer 3a to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer 3b (16 g).

SYNTHESIS EXAMPLE 4
(Synthesis of Polymethacrylate)

2 Grams of 4'-methacryloyloxychalcone and 50 mg of azobisisobutyronitrile were dissolved in 10 ml of tetrahydrofuran, and heated under reflux in a nitrogen atmosphere for 10 hours. A viscous reaction mixture was injected into methanol to precipitate a polymer. After drying, 2.2 g of a polymer 4b was obtained.

SYNTHESIS EXAMPLE 5
(Synthesis of Polymethacrylate)

2.5 Grams of 4(4-pentylphenyl)-4'-methacryloyloxychalcone and 50 mg of azobisisobutyronitrile were dissolved in 10 ml of tetrahydrofuran, and heated under reflux in a nitrogen atmosphere for 10 hours. A viscous reaction mixture was injected into methanol to precipitate a polymer. After drying, 2.0 g of a polymer 5b was obtained.

SYNTHESIS EXAMPLE 6
(Polymerization of Polyamic Acid)

0.1 mol (22.4 g) of 2,3,5-tricarboxycyclopentylacetic dianhydride and 0.1 mol (47.6 g) of 4'(4-pentylphenyl)-4(3,5-diaminophenoxy)chalcone were dissolved in 400 g of N-methyl-2-pyrrolidone, and allowed to react with each other at 60° C. for 6 hours.

The reaction mixture was then poured into a large excess of methanol to precipitate a reaction product. Thereafter, the reaction product was washed with methanol and dried at 40° C. under reduced pressure for 15 hours to obtain a polymer 6a (62 g).

(Imidization Reaction)

300 Grams of N-methyl-2-pyrrolidone, 8.2 g of pyridine and 9.6 g of acetic anhydride were added to 15.0 g of the obtained polymer 6a to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer 6b (10.5 g).

SYNTHESIS EXAMPLE 7
(Polymerization of Polyamic Acid)

0.1 mol (22.4 g) of 2,3,5-tricarboxycyclopentylacetic dianhydride, 0.05 mol (5.4 g) of p-phenylenediamine and 0.05 mol (16.5 g) of 4(3,5-diaminophenoxy)chalcone were dissolved in 350 g of N-methyl-2-pyrrolidone, and allowed to reach with one another at 60° C. for 6 hours.

The reaction mixture was then poured into a large excess of methanol to precipitate a reaction product. Thereafter, the reaction product was washed with methanol and dried at 40° C. under reduced pressure for 15 hours to obtain a polymer 7a (43 g).

(Imidization Reaction)

320 Grams of N-methyl-2-pyrrolidone, 8 g of pyridine and 10 g of acetic anhydride were added to 20.0 g of the obtained polymer 7a to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer 7b (15.0 g).

SYNTHESIS EXAMPLE 8
(Synthesis of Polymethacrylate)

2.5 Grams of 4-methacryloyloxychalcone and 20 mg of azobisisobutyronitrile were dissolved in 7.5 ml of diglyme, and allowed to react with each other in a nitrogen atmosphere at 60° C. for 10 hours. A viscous reaction mixture was injected into methanol to precipitate a polymer. After drying, a polymer 8b (2.5 g) was obtained.

SYNTHESIS EXAMPLE 9

(Synthesis of Polymethacrylate)

2.5 Grams of 4-methacryloyloxy-4'-(4-pentylphenyl) chalcone and 50 mg of azobisisobutyronitrile were dissolved in 10 ml of tetrahydrofuran and heated under reflux in a nitrogen atmosphere for 10 hours. A viscous reaction mixture was injected into methanol to precipitate a polymer. After drying, a polymer 9b (2.0 g) was obtained.

COMPARATIVE SYNTHESIS EXAMPLE (Polymerization of Polyamic Acid)

22.42 g of 2,3,5-tricarboxycyclopentylacetic dianhydride and 10.81 g of p-phenylenediamine were dissolved in 300 g of N-methyl-2-pyrrolidone, and allowed to react with each other at 60° C. for 6 hours.

The reaction mixture was then poured into a large excess of methanol to precipitate a reaction product. Thereafter, the reaction product was washed with methanol and dried at 40° C. under reduced pressure for 15 hours to obtain a polymer Aa (27.44 g).

(Imidization Reaction)

380 Grams of N-methyl-2-pyrrolidone, 9.52 g of pyridine and 12.29 g of acetic anhydride were added to 20.0 g of the obtained polymer Aa to carry out an imidization reaction at 120° C. for 4 hours.

The reaction mixture solution was then poured into a large excess of methanol to precipitate a reaction product. Thereafter, the reaction product was washed with methanol and dried under reduced pressure for 15 hours to obtain a polymer Ab (15.27 g).

REFERENTIAL EXAMPLE

The polymer 1b obtained in Synthesis Example 1 was dissolved in γ-butyrolactone to prepare a solution having a solids concentration of 4 wt %. This solution was filtered with a filter having a pore diameter of 1 $\mu$m to obtain a liquid crystal aligning agent solution.

This solution was applied onto a transparent electrode side of a glass substrate having the transparent electrode made from an ITO film with a spinner so as to have a thickness of 0.1 $\mu$m and dried at 180° C. for 1 hour to form a thin film.

This thin film was rubbed with a rubbing machine having a roll wound with a nylon cloth at a revolution of 500 rpm and a stage moving rate of 1 cm/sec.

Thereafter, an epoxy resin adhesive containing aluminum oxide particles having a diameter of 17 $\mu$m was applied to the outer periphery of each of a pair of substrates having a rubbed liquid crystal alignment film by a screen printing, the pair of substrates were bonded together under pressure in such a manner that their liquid crystal alignment film surfaces faced each other and their rubbing directions were perpendicular to each other, and the adhesive was hardened.

Nematic liquid crystals (ZLI-1565, trade name, a product of Merck Co., Ltd) were filled in a gap between the pair of substrates from liquid crystal injection ports, the liquid crystal injection ports were sealed up with an epoxy adhesive, polarizers were placed on exterior sides of the pair of substrates in such a manner that the polarizing directions of the polarizers agree with the respective rubbing directions of the liquid crystal alignment films of the substrates to obtain a liquid crystal display device. The alignment of the liquid crystals was satisfactory. When a voltage of 5 V was applied, changes in the brightness of the liquid crystal display device were observed in response to ON-OFF switching of the applied voltage.

EXAMPLE 1

The polymer 1b obtained in Synthesis Example 1 was used to form a thin film o n a substrate in the same manner as in Referential Example.

The thin film was exposed to linearly polarized ultraviolet light having a main wavelength of 365 nm and an energy of 0.5 J/cm$^2$ from the GLP-0-10-15-AN Glan Laser Prism (a product of Sigma Koki K.K.).

A liquid crystal display device was produced in the same manner as Referential Example except that the liquid crystal alignment films were placed one upon the other in a polarizing direction of the ultraviolet light in place of the rubbing direction. The alignment of the liquid crystals was satisfactory. When a voltage was applied under the same conditions as in Referential Example, changes in the brightness of the liquid crystal display device were observed in response to ON-OFF switching of the applied voltage.

EXAMPLES 2 TO 9

Liquid crystal display devices were produced in the same manner as in Example 1 except that the polymers 2b to 9b obtained in Synthesis Examples 2 to 9 were used. The alignment of each of the liquid crystal display devices was satisfactory. When voltage was applied under the same conditions as in Example 1, changes in the brightness of each of the liquid crystal display device were observed in response to ON-OFF switching of the applied voltage.

EXAMPLES 10 TO 13

Liquid crystal display devices were produced in the same manner as in Example 1 except that the polymers 6b to 9b obtained in Synthesis Examples 6 to 9 were used, a polarization filter SPF-50C-32 (trade name, a product of Sigma Koki K. K.) was used upon exposure to ultraviolet light, and linearly polarized ultraviolet light having an energy of 0.5 J/cm$^2$ but not containing a light component having a short wavelength of lower than 320 nm was applied. The alignment of each of the liquid crystal display devices was satisfactory. When voltage was applied under the same conditions as in Example 1, changes in the brightness of each of the liquid crystal display device were observed in response to ON-OFF switching of the applied voltage.

COMPARATIVE EXAMPLE

The polymer Ab obtained in Comparative Synthesis Example was used to form a thin film on a substrate as in Example 1, the thin film was exposed to linearly polarized ultraviolet light to form a liquid crystal alignment film, and a liquid crystal display device was produced using the film. The alignment of the liquid crystals was not observed.

According to the process for forming a liquid crystal alignment film using the liquid crystal aligning agent of the present invention, adhesion of dust and the circuit destruction of a TFT device caused by static electricity generated by rubbing treatment of the prior art do not occur and hence, a liquid crystal alignment film can be formed at a high yield. Since a liquid crystal alignment film formed using the liquid crystal aligning agent of the present invention is excellent in in-plane uniformity, when it is used in a TN or STN type liquid crystal display device, a liquid crystal display device having high display quality is obtained. This liquid crystal display device can be effectively used in various apparatuses and advantageously used in display devices for desk-top calculators, wrist watches, clocks, count display panels, word-processors, personal computers, liquid crystal TVs and the like.

What is claimed is:

1. A liquid crystal aligning agent composed of a polymer comprising at least one moiety selected from the group consisting of a moiety represented by the formula (1):

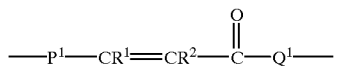
(1)

wherein $P^1$ is a divalent organic group having an aromatic ring,
$Q^1$ is a divalent aromatic ring,
and $R^1$ and $R^2$ are independently a hydrogen atom or an alkyl group,
a moiety represented by the formula (2):

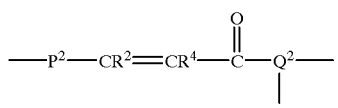
(2)

wherein $P^2$ is a monovalent organic group having an aromatic ring, $Q^2$ is a trivalent aromatic ring, and $R^3$ and $R^4$ are independently a hydrogen atom or an alkyl group,
a moiety represented by the formula (3):

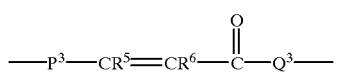
(3)

wherein $P^3$ is a monovalent organic group having an aromatic ring, $Q^3$ is a divalent organic group having an aromatic ring, and $R^5$ and $R^6$ are independently a hydrogen atom or an alkyl group,
a moiety represented by the formula (4):

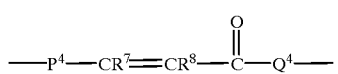
(4)

wherein $P^4$ is a divalent organic group having an aromatic ring, $Q^4$ is a monovalent aromatic ring, and $R^7$ and $R^8$ are independently a hydrogen atom or an alkyl group,
and a moiety represented by the formula (5):

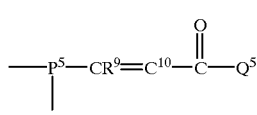
(5)

wherein $P^5$ is a trivalent organic group having an aromatic ring, $Q^5$ is a monovalent aromatic ring, and $R^9$ and $R^{10}$ are independently a hydrogen atom or an alkyl group.

2. The liquid crystal aligning agent of claim 1, wherein the moiety represented by the formula (4) is a moiety represented by the following formula (4)-1:

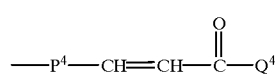
(4)-1 wherein $P^4$ and $Q^4$ are the same as defined in the formula (4).

3. The liquid crystal aligning agent of claim 1, wherein the moiety represented by the formula (5) is a moiety represented by the following formula (5)-1:

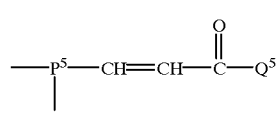
(5)-1 wherein $P^5$ and $Q^5$ are the same as defined in the formula (5).

4. The liquid crystal aligning agent of claim 1, wherein the polymer is a polyimide containing at least one of the above moieties.

5. The liquid crystal aligning agent of claim 2, wherein the polymer is a polyimide containing the moiety.

6. A process for producing a liquid crystal alignment film comprising irradiating a thin film of the liquid crystal aligning agent of claim 1 with linearly polarized radiation.

7. The process of claim 6, wherein the thin film is formed on a substrate for forming a liquid crystal display device.

8. A process for producing a liquid crystal alignment film comprising irradiating a thin film of the liquid crystal aligning agent of claim 2 or 3 with linearly polarized ultraviolet light comprising a light component having a wavelength of 320 nm or more.

9. The process of claim 8, wherein the thin film is formed on a substrate for forming a liquid crystal display device.

10. The liquid crystal aligning agent of claim 3, wherein the polymer is a polyimide containing at least one of the moieties.

11. The liquid crystal aligning agent of claim 1, wherein in the formula (1), $P^1$ is a divalent organic group having an aromatic ring having a total of from 6 to 20 carbon atoms and $Q^1$ is a divalent aromatic ring having 6 to 20 carbon atoms.

12. The liquid crystal aligning agent of claim 1, wherein in the formula (1), $P^1$ and $Q^1$ are each independently 1,2-phenylene, 1,3-phenylene, 1,4-phenylene or 4,4'-biphenylene.

13. The liquid crystal aligning agent of claim 1, wherein in the formula (1), $R^1$ and $R^2$ are independently hydrogen or $C_1$–$C_6$ alkyl.

14. The liquid crystal aligning agent of claim 1, wherein in the formula (2), $P^2$ is a monovalent organic group having an aromatic ring with a total of 6 to 20 carbon atoms.

15. The liquid crystal aligning agent of claim 14, wherein $P^2$ is 4-pentylphenyl, 4-fluorophenyl, 3,4-difluorophenyl, 3,4,5-trifluorophenyl, 4-octylphenyl, 4-pentylbiphenyl, 4-octylphenyl, 4-pentylbiphenyl, 4-octylbiphenyl, 4-fluorobiphenyl, 3,4-difluorobiphenyl, 3,4,5-trifluorobiphenyl, 4-octyl-1-naphthyl, 5-pentyl-1-naphthyl, 6-octyl-2-naphthyl, 9-anthracenyl, and 10-pentyl-9-anthracenyl.

16. The liquid crystal aligning agent of claim 1, wherein in the formula (2), $Q^2$ is a trivalent aromatic ring with a total of 6 to 20 carbon atoms.

17. The liquid crystal aligning agent of claim 16, wherein $Q^2$ is selected from the group consisting of

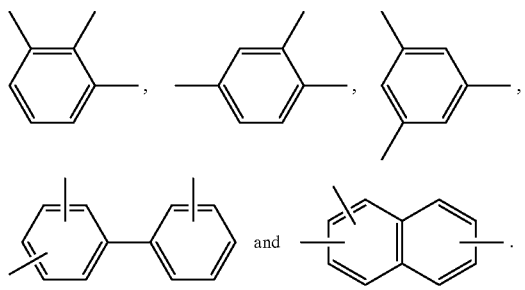

18. The liquid crystal aligning agent of claim 1 wherein in the formula (2), $R^3$ and $R^4$ are independently hydrogen or $C_1$–$C_6$ alkyl.

19. The liquid crystal aligning agent of claim 1, wherein the formula (3), $P^3$ is a monovalent organic group having an aromatic ring with a total of 6 to 20 carbon atoms.

20. The liquid crystal aligning agent of claim 19 wherein $P^3$ is 4-pentylphenyl, 4-fluorophenyl, 3,4-difluorophenyl, 3,4,5-trifluorophenyl, 4-octylphenyl, 4-pentylbiphenyl, 4-octylphenyl, 4-pentylbiphenyl, 4-octylbiphenyl, 4-fluorobiphenyl, 3,4-difluorobiphenyl, 3,4,5-trifluorobiphenyl, 4-octyl-1-naphthyl, 5-pentyl-1-naphthyl, 6-octyl-2-naphthyl, 9-anthracenyl, and 10-pentyl-9-anthracenyl.

21. The liquid crystal aligning agent of claim 1, wherein in the formula (3), $Q^3$ is a divalent organic group having an aromatic ring with a total of 6 to 20 carbon atoms.

22. The liquid crystal aligning agent of claim 21, wherein $Q^3$ is 1,2-phenylene, 1,3-phenylene, 1,4-phenylene or 4,4'-biphenylene.

23. The liquid crystal aligning agent of claim 1, wherein in the formula (3), $R^5$ and $R^6$ are independently hydrogen of $C_1$–$C_6$ alkyl.

24. The liquid crystal aligning agent of claim 1, wherein in the formula (4), $P^4$ is a divalent organic group having an aromatic ring with a total of 6 to 20 carbon atoms.

25. The liquid crystal aligning agent of claim 24, wherein $P^4$ is 1,2-phenylene, 1,3-phenylene, 1,4-phenylene or 4,4'-biphenylene.

26. The liquid crystal aligning agent of claim 1, wherein in the formula (4), $Q^4$ is a monovalent organic group having a total of 6 to 20 carbon atoms.

27. The liquid crystal aligning agent of claim 26, wherein $Q^4$ is 4-pentylphenyl, 4-fluorophenyl, 3,4-difluorophenyl, 3,4,5-trifluorophenyl, 4-octylphenyl, 4-pentylbiphenyl, 4-octylphenyl, 4-pentylbiphenyl, 4-octylbiphenyl, 4-fluorobiphenyl, 3,4-difluorobiphenyl, 3,4,5-trifluorobiphenyl, 4-octyl-1-naphthyl, 5-pentyl-1-naphthyl, 6-octyl-2-naphthyl, 9-anthracenyl, and 10-pentyl-9-anthracenyl.

28. The liquid crystal aligning agent of claim 1, wherein in the formula (4), $R^7$ and $R^8$ are independently hydrogen or $C_1$–$C_6$ alkyl.

29. The liquid crystal aligning agent of claim 1, wherein in the formula (5), $P^5$ is a trivalent organic group having an aromatic ring with a total of 6 to 20 carbon atoms.

30. The liquid crystal aligning agent of claim 29, wherein $P^5$ is

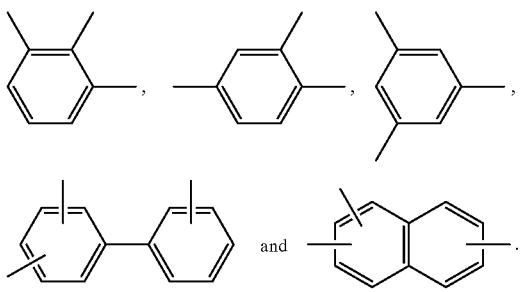

31. The liquid crystal aligning agent of claim 1, wherein in the formula (5), $Q^5$ is a monovalent organic group having an aromatic ring with a total of 6 to 20 carbon atoms.

32. The liquid crystal aligning agent of claim 31, wherein $Q^5$ is 4-pentylphenyl, 4-fluorophenyl, 3,4-difluorophenyl, 3,4,5-trifluorophenyl, 4-octylphenyl, 4-pentylbiphenyl, 4-octylphenyl, 4-pentylbiphenyl, 4-octylbiphenyl, 4-fluorobiphenyl, 3,4-difluorobiphenyl, 3,4,5-trifluorobiphenyl, 4-octyl-1-naphthyl, 5-pentyl-1-naphthyl, 6-octyl-2-naphthyl, 9-anthracenyl, and 10-pentyl-9-anthracenyl.

33. The liquid crystal aligning agent of claim 1, wherein in the formula (5), $R^9$ and $R^{10}$ are independently hydrogen or $C_1$–$C_6$ alkyl.

34. The process of claim 6, wherein said radiation has a wavelength of from 150 to 800 nm.

35. The process of claim 34 wherein said radiation has a wavelength of from 240 to 450 mn.

36. The process of claim 34 wherein said radiation has a wavelength of from 320 to 450 mn.

37. The process of claim 34 which further comprises heating said irradiated thin film of said liquid crystal aligning agent at from 150 to 250° C., in order to provide liquid crystal alignment properties.

* * * * *